United States Patent
Ke et al.

(10) Patent No.: US 8,456,651 B2
(45) Date of Patent: Jun. 4, 2013

(54) FOCAL POSITION DETECTING METHOD

(75) Inventors: Shun-Sheng Ke, Kaohsiung (TW);
Meng-Che Tsai, Kaohsiung (TW);
Yang-Cheng Lin, Chiayi (TW);
Pin-Hao Hu, Kaohsiung (TW); Yu-Hsiu Chang, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 569 days.

(21) Appl. No.: 12/703,894

(22) Filed: Feb. 11, 2010

(65) Prior Publication Data
US 2011/0134416 A1 Jun. 9, 2011

(30) Foreign Application Priority Data
Dec. 9, 2009 (TW) ................................ 98142025 A

(51) Int. Cl.
*G01J 1/00* (2006.01)
*G01J 1/20* (2006.01)

(52) U.S. Cl.
USPC .......................................................... 356/624

(58) Field of Classification Search
USPC .................... 356/123, 622, 624, 614, 615; 250/201.2–201.8
See application file for complete search history.

(56) References Cited

U.S. PATENT DOCUMENTS

| 4,816,665 | A | 3/1989 | Ksu |
| 5,714,749 | A * | 2/1998 | Yonezawa et al. ......... 250/201.2 |
| 7,298,549 | B2 | 11/2007 | Muller |
| 2001/0042816 | A1 * | 11/2001 | Fujimoto et al. ........... 250/201.2 |

FOREIGN PATENT DOCUMENTS

JP 2006285154 * 10/2006

* cited by examiner

*Primary Examiner* — Gregory J Toatley
*Assistant Examiner* — Rebecca C Bryant

(57) ABSTRACT

A focal position detecting apparatus, for detecting a focusing condition and a tilting condition of an object, includes a planar beam generating module, an optical system, an optical sensor and a cylindrical lens. The planar beam generating module generates a planar light beam along a first path. The optical system is disposed on the first path, wherein the planar light beam, reflected by the object, passes through the optical system along a second path. The optical sensor is disposed on the second path. The cylindrical lens is disposed on the second path between the optical system and the optical sensor and an axis of the cylindrical lens is perpendicular to the second path. The planar light beam passes through the optical system and the cylindrical lens along the second path, before it is incident on the optical sensor to form a linear light spot for determining defocusing degree.

9 Claims, 6 Drawing Sheets

FOCAL POSITION DETECTING METHOD

CROSS REFERENCE TO RELATED APPLICATIONS

This Application claims priority of Taiwan Patent Application No. 098142025, filed on Dec. 9, 2009, the entirety of which is incorporated by reference herein.

TECHNICAL FIELD

The disclosure relates to a focal position detecting apparatus and method, and in particular, to a focal position detecting apparatus and method for detecting a defocusing distance, a defocusing position of a light beam and a tilting condition of an object.

BACKGROUND

Focal position detecting apparatuses are usually applied for optical inspection and in laser machining applications. For laser machining applications, a work-piece may have an uneven surface profile. Thus, a focal position detecting apparatus is used to ensure that the uneven surfaces of a work-piece are precisely machined by a laser beam. For optical inspections, a focal position detecting apparatus is used to ensure an inspected image is in focus for precise inspections.

SUMMARY

Accordingly, a focal position detecting apparatus for detecting a focusing condition and a tilting condition of an object is provided. The focal position detecting apparatus comprises a planar beam generating module, an optical system, an optical sensor and a cylindrical lens. The planar beam generating module generates a planar light beam along a first path. The optical system is disposed on the first path, wherein the planar light beam, reflected by the object, passes through the optical system along a second path. The optical sensor is disposed on the second path. The cylindrical lens is disposed on the second path between the optical system and the optical sensor and an axis of the cylindrical lens is perpendicular to the second path. The planar light beam passes through the optical system and the cylindrical lens along the second path, and is them incident on the optical sensor.

A method of detecting a focal position of a light beam comprises providing a focal position detecting apparatus for detecting a focusing condition and a tilting condition of an object. In the focal position detecting apparatus, a planar light beam passes through the cylindrical lens to form a linear light spot on the optical sensor. Thereafter, a defocusing degree of the light beam is determined according to the length of the linear light spot.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1A:
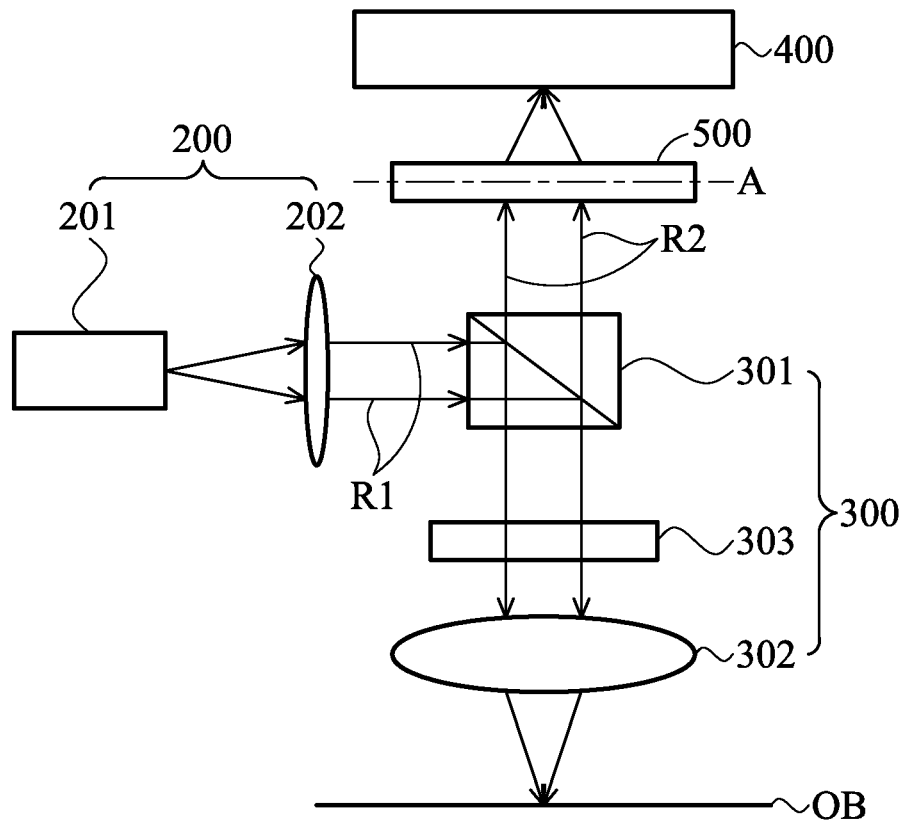
FIG. 1A is a schematic view of a focal position detecting apparatus in accordance with an embodiment.
Figure 2A:
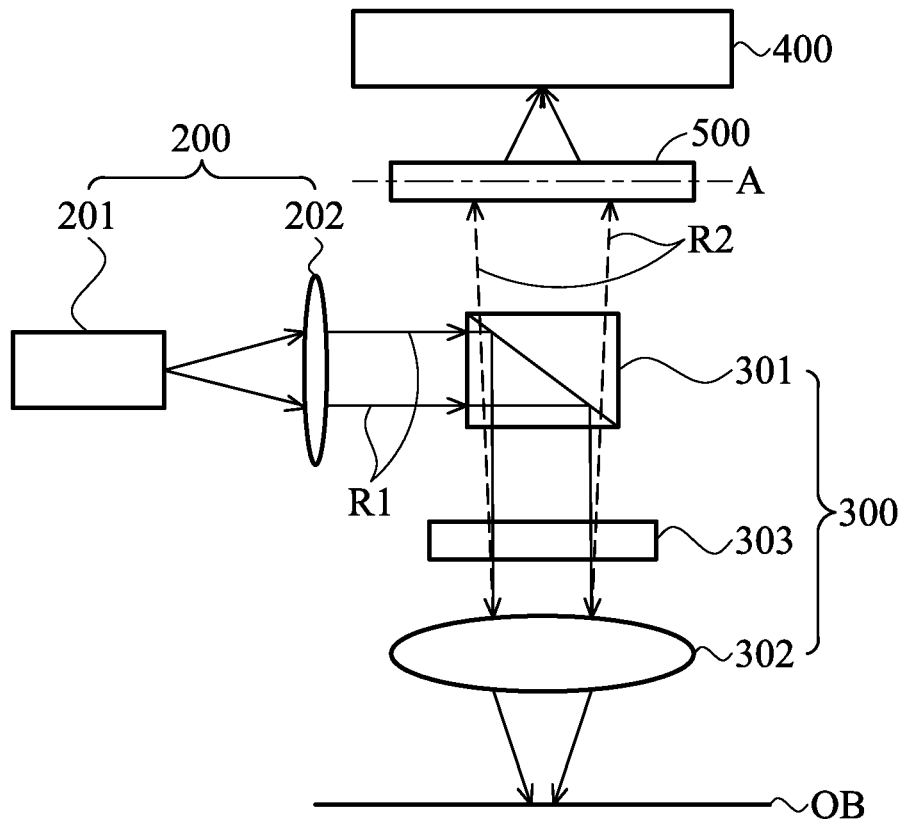
FIG. 2A is a schematic view of a focal position detecting apparatus in accordance with the embodiment.
Figure 3A:
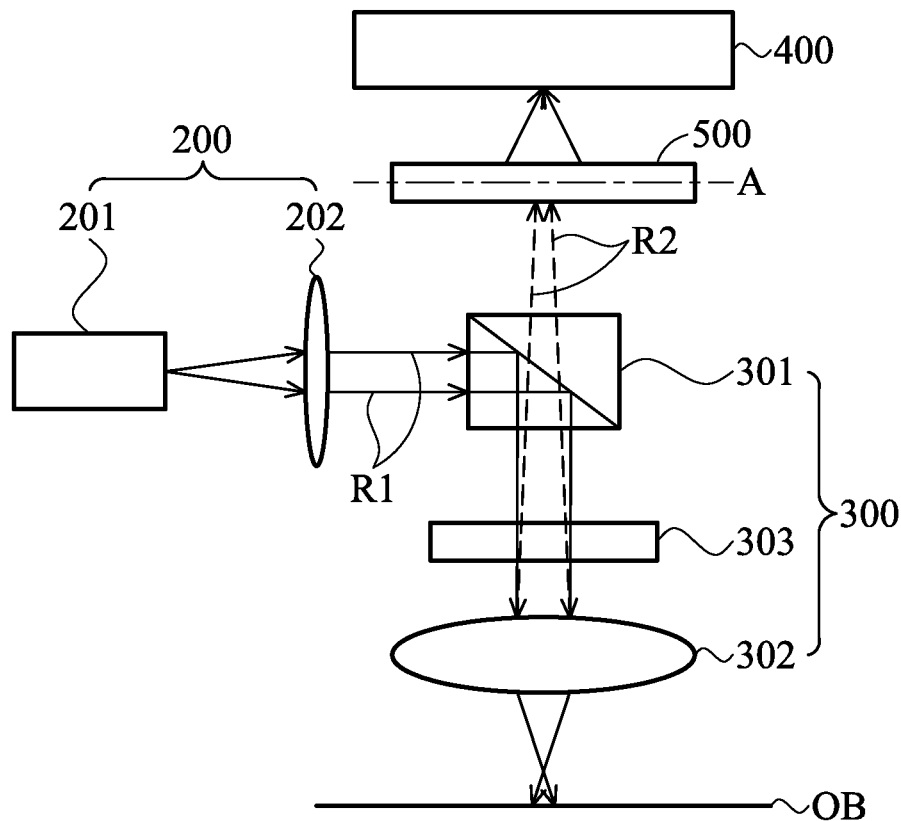
FIG. 3A is a schematic view of a focal position detecting apparatus in accordance with the embodiment.

Referring to FIGS. 1A, 2A and 3A, the focal position detecting apparatus 100 comprises a planar light generating module 200, an optical system 300, an optical sensor 400 and a cylindrical lens 500.

The planar light generating module 200 comprises a light source 201 and a beam expander 202. The light source 201 comprises a laser light source, a light emitting diode or an incandescent light source to provide a light beam. The beam expander 202 expands and collimates the light beam into a planar light beam proceeding along a first path R1.

The optical system 300 comprises a polarized beam splitter 301, a focus lens 302 and a quarter-wave plate 303. The polarized beam splitter 301 is disposed on the first path R1, the focus lens 302 is disposed between the polarized beam splitter 301 and an object OB, and the quarter-wave plate 303 is disposed between the polarized beam splitter 301 and the focus lens 302. The polarized beam splitter 301 reflects the surface polarized wave (S-wave) and allows the plane polarized wave (P-wave) to pass directly through, wherein the S-wave passes through the quarter-wave plate 303 and the focus lens 302 before being projected onto a surface of the object OB. The S-wave is reflected by the surface of the object OB toward a second path R2, and then passes through the optical system 300 again. In detail, the reflected light beam from the object OB again passes through the focus lens 302 and the quarter-wave plate 303. Meanwhile, the S-wave passes through the quarter-wave plate 303 twice to be transformed into the P-wave. The P-wave is then directly passed through the polarized beam splitter 301 to be incident onto the optical sensor 400.

It should be noted that the optical system 300 is not limited to comprise the above described elements. The optical system 300 may comprises a beam splitter and a focus lens. In such a case, the beam splitter is disposed on the first path R1, and the focus lens is disposed between the beam splitter and the object. The light beam passes through the beam splitter and the focus lens before being projected onto the object. The light beam is then reflected by the object toward the second path R2 and then passes through the focus lens and the beam splitter to be incident onto the optical sensor 400, wherein the second path R2 is a straight line path.

The optical sensor 400 and the cylindrical lens 500 are both disposed on the second path R2, and the cylindrical lens 500 is disposed between the optical system 300 and the optical sensor 400. The optical sensor 400 comprises a charge coupled device (CCD)), a complementary metal oxide semiconductor (CMOS) sensor, a position sensitive device (PSD), or a photo diode array (PD array) sensor, and the cylindrical lens 500 comprises a circular cross section or a semicircular cross section. Also, an axis A of the cylindrical lens 500 is substantially perpendicular to the second path R2 (as shown in FIGS. 1A, 2A and 3A).

After the light beam reflected by the object OB has passed through the optical system 300, it passes through the cylindrical lens 500 to form a linear light spot on the optical sensor 400. The focusing condition of the light beam and the tilting condition of the object are then determined by the formation of the linear light spot.

Figure 1B:
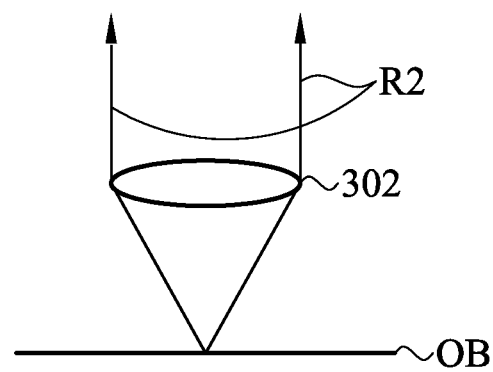
FIG. 1B is an enlarged view showing a portion of the light path in the focal position detecting apparatus in FIG. 1A.
Figure 2B:
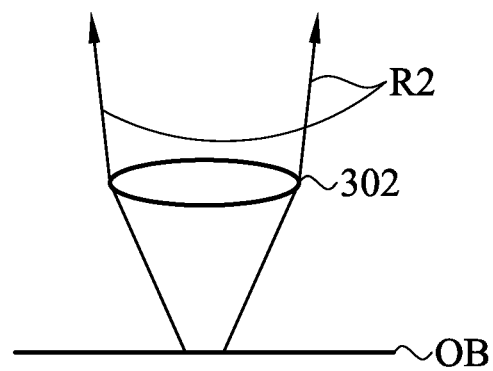
FIG. 2B is an enlarged view showing a portion of the light path in the focal position detecting apparatus in FIG. 2A.
Figure 3B:
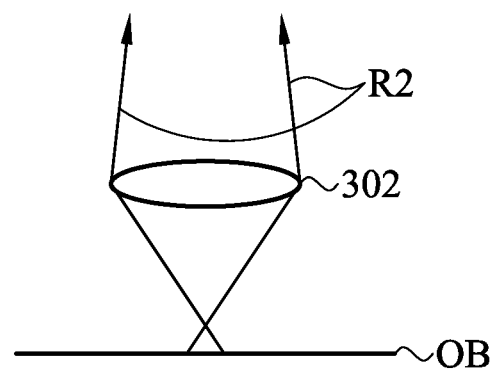
FIG. 3B is an enlarged view showing a portion of the light path in the focal position detecting apparatus in FIG. 3A.
Figure 4A:
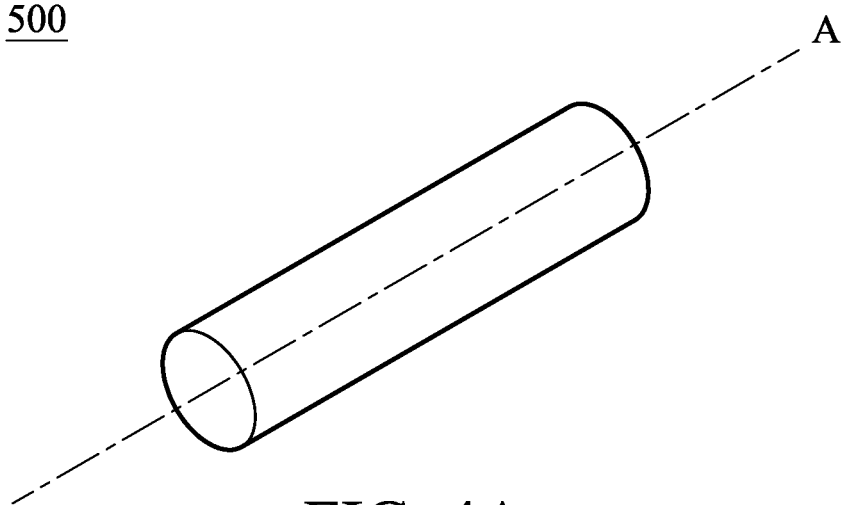
FIGS. 4A and 4B are schematic views showing a cylindrical lens of the focal position detecting apparatus in accordance with an embodiment.
Figure 4B:
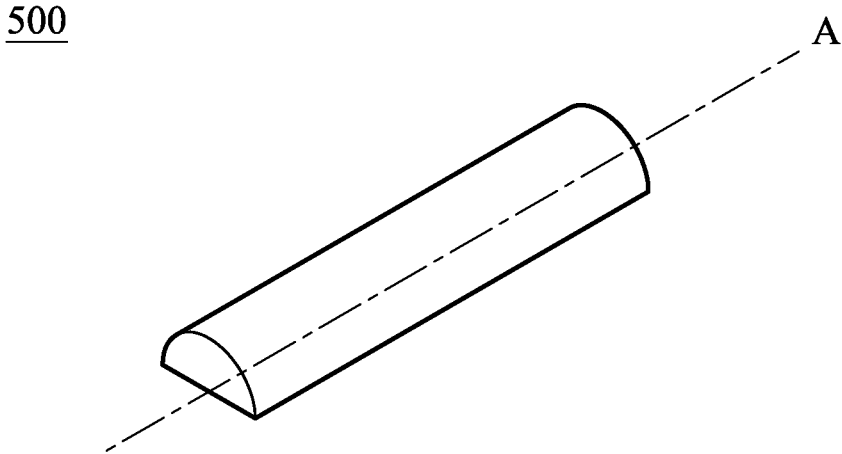
Figure 5:
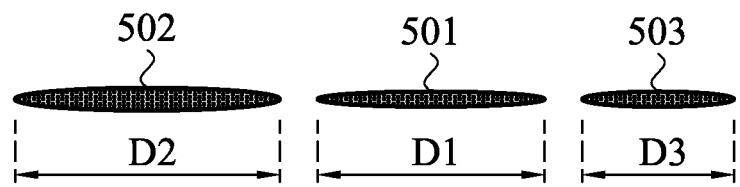
FIG. 5 is a schematic view showing an image formed by a light beam in an optical sensor of the focal position detecting apparatus in accordance with the embodiment.
Figure 7:
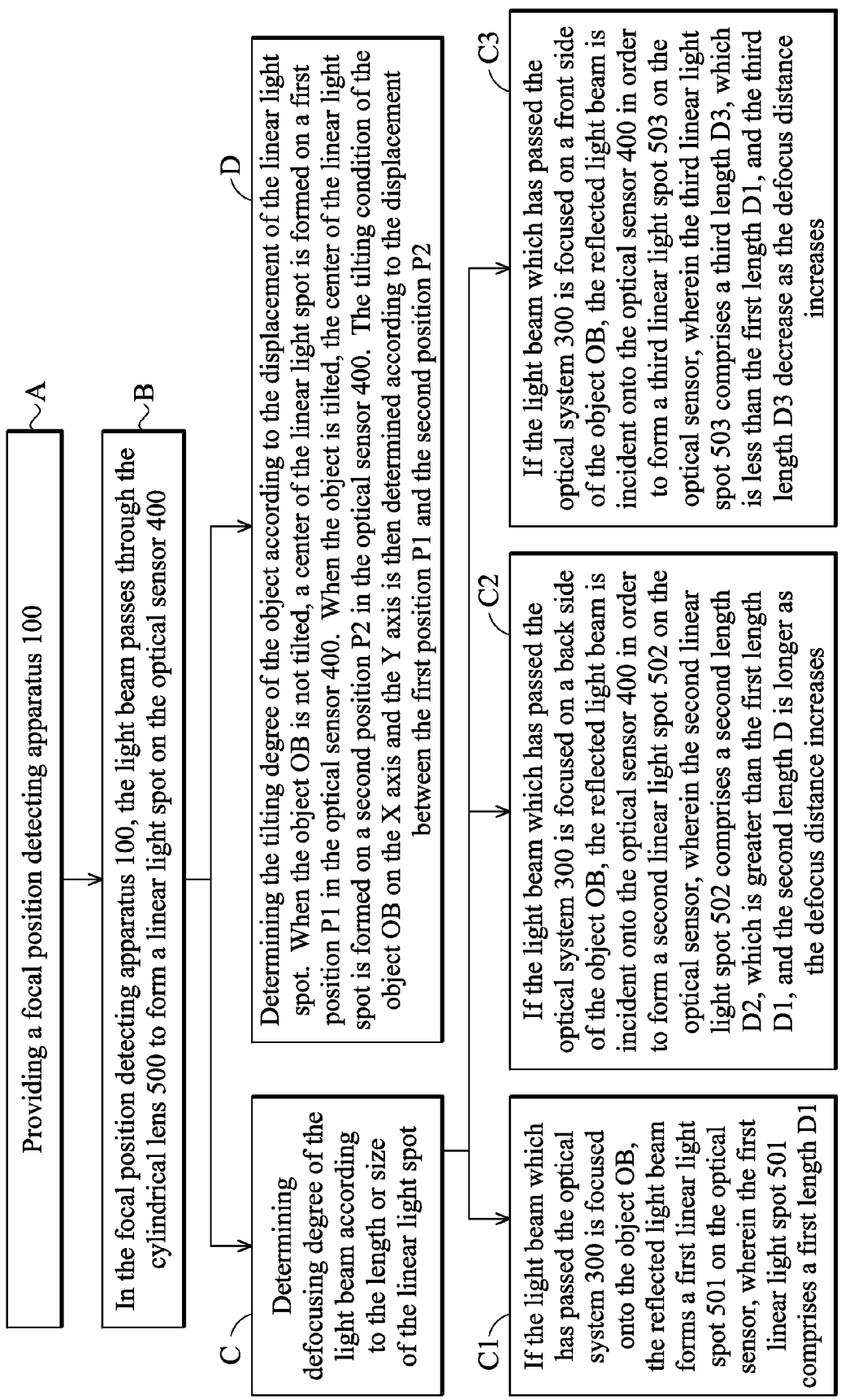
FIG. 7 is a flow chart showing a method of detecting a focal position of the light beam in accordance with an embodiment.

A method of detecting a focal condition of a light beam and tilting condition of an object is provided along with FIG. 7. The method comprises: A: providing a focal position detecting apparatus 100 as described above; B: in the focal position detecting apparatus 100, the light beam passes through the cylindrical lens 500 to form a linear light spot on the optical sensor 400; and C: determining defocusing degree of the light beam according to the length or size of the linear light spot. Referring to FIGS. 1B and 5, in the step of C1: as shown in FIG. 1B, if the light beam which has passed the optical system 300 is focused onto the object OB, the reflected light from the object OB will proceed along the second path R2 and pass through the cylindrical lens 500 to be incident into the optical sensor 400. The light beam forms a first linear light spot 501 on the optical sensor, wherein the first linear light spot 501 comprises a first length D1. Referring to FIGS. 2B and 5, in the step of C2: as shown in FIG. 2B, if the light beam which has passed the optical system 300 is focused on a back side of the object OB, the reflected light from the object OB will proceed along the second path R2 and pass through the cylindrical lens 500 to be incident onto the optical sensor 400 in order to form a second linear light spot 502 on the optical sensor, wherein the second linear light spot 502 comprises a second length D2. The second length D2 is greater than the first length D1, and the second length D is longer as the defocus distance increases. Referring to FIGS. 3B and 5, in the step of C3: as shown in FIG. 3B, if the light beam which has passed the optical system 300 is focused on a front side of the object OB, the reflected light from the object OB will proceed along the second path R2 and pass through the cylindrical lens 500 to be incident onto the optical sensor 400 in order to form a third linear light spot 503 on the optical sensor, wherein the third linear light spot 503 comprises a third length D3. The third length D3 is less than the first length D1, and the third length D3 decrease as the defocus distance increases.

Figure 6:
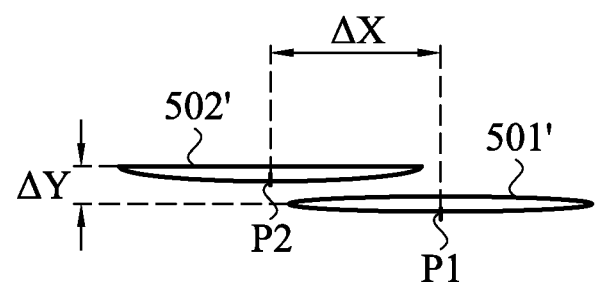
FIG. 6 is a schematic view showing an image formed by a light beam in an optical sensor of the focal position detecting apparatus in accordance with the embodiment.

The method of detecting a focal condition of a light beam and tilting condition of the object further comprises a method D: determining the tilting degree of the object according to the displacement of the linear light spot. Referring to FIG. 6, in the step D, when the object OB is not tilted, a center of the linear light spot 501' is formed on a first position P1 (a reference position) in the optical sensor 400. When the object is tilted, the center of the linear light spot 502' is formed on a second position P2 in the optical sensor 400. As shown in FIG. 6, in the embodiment, the second position P2 if shifted from the first position P1 on both the X axis and the Y axis ($\Delta X$, $\Delta Y$). In other words, the tilting condition of the object OB on the X axis and the Y axis is then determined according to the displacement between the first position P1 and the second position P2.

The focal position detecting apparatus 400 utilizes the formation of a linear light spot on the optical sensor 400, such that the focus degree of the light beam can be determined according to the length and the size of the linear light spot. Further, the tilting degree of the object can also be determined according to the displacement of the linear light spot from the reference position.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of detecting a focal position of a light beam, comprising:
    providing a focal position detecting apparatus, comprising:
        a planar beam generating module generating a planar light beam along a first path;
        an optical system disposed on the first path, wherein the planar light beam, reflected by an object, passes through the optical system along a second path, wherein the second path is a straight line path;
        an optical sensor disposed on the second path; and
        a cylindrical lens disposed on the second path between the optical system and the optical sensor, wherein an axis of the cylindrical lens is perpendicular to the second path;
        wherein the planar light beam passes through the optical system and the cylindrical lens along the second path before it is incident on the optical sensor, and wherein the light beam passes through the cylindrical lens to form a linear light spot on the optical sensor;
    determining a defocusing degree of the light beam according to a length of the linear light spot; and
    determining a tilting degree of the object according to a displacement of the linear light spot.

2. The method of detecting a focal position of an object as claimed in claim 1, wherein in the step of determining the defocusing degree of the light beam according to the length of the linear light spot, when the planar light beam is focused onto the object, the linear light spot has a specific length, and when a length of the linear light spot is greater than the specific length, the planar light beam is determined to be focusing on the front side of the object, and when a length of the linear light spot is less than the specific length, the planar light beam is determined to be focusing on the back side of the object.

3. The method of detecting a focal position of an object as claimed in claim 1, wherein in the step for determining the tilting degree of the object according to the displacement of the linear light spot, when the object is not tilted, a center of the linear light spot is formed on a first position in the optical sensor, and when the object is tilted, a center of the linear light spot is formed on a second position in the optical sensor, and the tilting degree of the object is determined according to the displacement between the first position and the second position.

4. The method of detecting a focal position of an object as claimed in claim 1, wherein the planar beam generating module comprises:
    a light source providing a light beam; and
    a beam expander collimating and expanding the light beam into the planar light beam.

5. The method of detecting a focal position of an object as claimed in claim 4, wherein the light source comprises a laser light source, a light emitting diode or an incandescent light source.

6. The method of detecting a focal position of an object as claimed in claim 1, wherein the optical system comprises:
- a polarized beam splitter disposed on the first path;
- a focusing lens disposed between the polarized beam splitter and the object; and
- a quarter-wave plate disposed between the polarized beam splitter and the focusing lens;
- wherein the planar light beam passes through the polarized beam splitter, the quarter-wave plate and the focusing lens in sequence before it is projected onto the object, and the planar light beam, which is reflected by the object, then passes through the focusing lens, the quarter-wave plate and the polarized beam splitter in sequence.

7. The method of detecting a focal position of an object as claimed in claim 1, wherein the optical system comprises:
- a beam splitter disposed on the first path; and
- a focusing lens disposed between the beam splitter and the object;
- wherein the planar light beam passes through the beam splitter and the focusing lens in sequence before it is projected onto the object, and the planar light beam, which is reflected by the object, then passes through the focusing lens and the beam splitter in sequence.

8. The method of detecting a focal position of an object as claimed in claim 1, wherein the optical sensor comprises a charge coupled device (CCD), a complementary metal oxide semiconductor (CMOS) sensor, a position sensitive device (PSD), or a photo diode array (PD array) sensor.

9. The method of detecting a focal position of an object as claimed in claim 1, wherein the cylindrical lens comprises a circular cross section or a semicircular cross section.

\* \* \* \* \*